Patented Dec. 8, 1931

1,835,927

UNITED STATES PATENT OFFICE

GROVER BLOOMFIELD, JEROME MARTIN, AND IGNACE J. KRCHMA, OF TERRE HAUTE, INDIANA, ASSIGNORS TO COMMERCIAL SOLVENTS CORPORATION, OF TERRE HAUTE, INDIANA, A CORPORATION OF MARYLAND

NITROCELLULOSE LACQUER THINNER

No Drawing.   Application filed March 12, 1928.   Serial No. 261,184.

Our invention relates to a method of making thinners suitable for use with nitrocellulose lacquers and particularly a thinner containing butyl acetate, ethyl acetate, ethyl alcohol, butyl alcohol and toluol.

Nitrocellulose lacquers containing fairly high proportions of pigments cannot readily be shipped in the form in which they are used, because the pigments and gums tend to settle out in the bottom of the container and it is rather difficult to get them back into solution again with the assurance that no undissolved solid lumps or particles that would mar the finished surface will be present. For this reason automobile lacquer is generally shipped as a heavy base lacquer, so thick and viscous that its constituents will not ordinarily separate thru the influence of gravity. This material is then thinned at the plant where it is to be used with a thinner composed of a suitable mixture of solvent and non-solvent materials.

The general requirements for a good lacquer thinner are several in number. From the standpoint of economy, as well as for other reasons, it is not generally desired to have the entire liquid portion of a lacquer composed of solvent materials. The liquids employed for diluting a lacquer to the proper consistency for application contain, in most cases, either coal tar or petroleum hydrocarbons, both groups of which materials are non-solvents for nitrocellulose. Altho other factors also come into consideration, it is highly important that the thinner composition be a solvent for nitrocellulose, regardless of the composition of the mixed lacquer and thinner. If the thinner contains sufficient hydrocarbon or diluent to make the mixture a non-solvent for nitrocellulose, the addition of thinner to the lacquer may cause the precipitation of nitrocellulose which is redissolved only with considerable difficulty.

It is equally important that the various solvents and non-solvents used in the production of a lacquer thinner be present in the proper proportions and also have the proper rate of evaporation. It is obvious that if the solvents present in a lacquer evaporate at a much faster rate than do the non-solvents, the relative amounts of these two constituents must be carefully regulated so as to prevent an excess of non-solvent at any time in the lacquer or drying film. Should an excess of non-solvent occur at any time before the film has dried, the precipitation of nitrocellulose will result, giving, in general, an unsatisfactory finish.

Another familiar phenomenon also occurs if the thinner does not contain the proper solvent in the proper proportions. This phenomenon, known as "blushing", occurs when moisture is condensed upon the work under humid conditions, or conversely, when some of the moisture present in the original lacquer is not carried off. In order to prevent blushing, the thinner should be made of liquids of reasonably slow rate of evaporation and preferably, not miscible with water.

Thinners meeting the above requirements and having approximately the following composition have been very generally used in the industry: 5 to 25% ethyl acetate, 20 to 40% butyl acetate, 10 to 20% butyl alcohol, and 20 to 60% diluent. The diluent has usually been toluol but may be substituted in part or wholly by other hydrocarbons such as xylol or "V. M. P. naphtha". A thinner equally as satisfactory from the standpoint of blushing and at the same time somewhat less expensive may be obtained by substituting ethyl alcohol for a portion of the ethyl acetate. Our invention pertains to a novel process of preparing such a thinner, at considerably lower costs than by any previous method. Our process may be fully understood from the following description.

The first step in our new process of preparing lacquer thinners involves the preparation of an approximately 50% solution of ethyl acetate in ethyl alcohol. This may be done by mixing appropriate quantities of commercial ethyl acetate and ethyl alcohol. We prefer, however, to prepare the ethyl acetate-ethyl alcohol mixture by the method described in a co-pending application, Serial 278,333, filed May 16, 1928, for preparing ethyl acetate by passing ethyl alcohol over a suitable catalyst, the resulting product consisting of 8–15% ethyl acetate and 92–85% ethyl alcohol. The concentration of the ethyl acetate to the desired strength may be effected in several ways. For example, water may be added to the ethyl acetate-ethyl alcohol mixture and the resulting solution subjected to distillation. In this manner a distillate containing approximately 50% or more ester may be obtained by one fractionation. Another method of effecting the desired concentration of the ethyl acetate is by the addition of water and a high-boiling hydrocarbon such as xylol or mesitylene to the ethyl acetate-ethyl alcohol mixture. The resulting mixture after agitation separates into two separate layers, the water layer containing the greater portion of the ethyl alcohol and the hydrocarbon layer, the greater portion of the ethyl acetate. The latter may then be separated from the hydrocarbon by fractional distillation.

After the preparation of the ethyl acetate-ethyl alcohol solution by any of the methods described above, we proceed as follows. Reflux for ½ to 3 hours, a mixture composed approximately of: 1 volume butyl alcohol; 2.5 volumes of a mixture which is approximately 50% ethyl acetate and 50% ethyl alcohol; 3 volumes toluol; 4 volumes water; 0.6 volume concentrated sulphuric acid (catalyst).

During the course of the refluxing, alcoholysis takes place resulting in the formation of butyl acetate and ethyl alcohol from the butyl alcohol and ethyl acetate. At the conclusion of the refluxing, the reaction products separate into two separate layers of liquids, the water layer containing the greater portion of the ethyl alcohol and smaller portions of the other materials present. The toluol layer contains the greater portion of the butyl acetate, ethyl acetate, and butyl alcohol, as well as a smaller amount of ethyl alcohol. The two layers of liquids are separated and subjected to fractional distillation. By distilling approximately 10–20% of the toluol layer, a mixture, partly of constant boiling composition and composed of toluol, water, ethyl alcohol and ethyl acetate is removed, leaving approximately five volumes of dry liquid having approximately the following composition: butyl acetate 20%, ethyl acetate 5%, ethyl alcohol 5%, butyl alcohol 5%, toluol 65%. The materials removed by distillation from both the water layer and the toluol layer may be recovered, and again used in the process with the result that the losses occurring during the operation are negligible.

It is distinctly understood that the lacquer thinner described above is cited only as an example of compositions of a similar character which may be prepared by our new process. The relative amounts of the final product described above may be varied somewhat by varying the amounts of the materials entering into the reaction and also the relative proportion of ester to alcohol in the ester-alcohol mixture. In addition to varying the relative proportions of the materials comprising the thinner, we may also vary the constituents. For example, we may substitute amyl alcohol for butyl alcohol with the result that the final product will contain amyl acetate instead of butyl acetate. Whatever alcohol is used in place of butyl alcohol, should, at most, be but slightly soluble in water, so that this alcohol will, after refluxing, be in the hydrocarbon layer. In the place of toluol, we may use xylol or a petroleum hydrocarbon such as "V. M. P. naphtha". In place of ethyl acetate, esters of other acids and of other strongly water-soluble alcohols may be used, or an ester may be used alone. Since, however, it is simpler to prepare an ester-alcohol mixture than a pure ester, the starting material will, as a rule, consist of the former. It should be pointed out, however, that if it is found desirable for any reason to change one of the constituents of the reaction mixture, it will in most cases be necessary to modify also the character of one or more of the remaining constituents in order that the lacquer thinner to be produced will be properly balanced as to rate of evaporation, etc. We may also employ other substances than sulphuric acid as the catalyst for effecting the reaction, as for example, hydrochloric acid or phosphoric acid.

Now having described our invention, what we claim is:

1. The process of preparing a lacquer thinner which comprises reacting an alcohol with an ester in the presence of the alcohol of the said ester, a hydrocarbon, and water; recovering the resulting hydrocarbon layer; and finally removing the water from the said hydrocarbon layer, by distillation, as a part of a constant-boiling mixture.

2. The process of preparing a lacquer thinner which comprises reacting a weakly water-soluble alcohol with an ester of a strongly water-soluble alcohol in the presence of the alcohol of the said ester, a hydrocarbon, and water; recovering the resulting hydrocarbon layer; and finally removing the water from the said hydrocarbon layer, by distillation, as a part of a constant-boiling mixture.

3. The process of preparing a lacquer thinner which comprises reacting an alcohol with an ester in the presence of water and a hydrocarbon; recovering the resulting hydrocarbon layer; and finally removing the water from the said hydrocarbon layer, by distillation, as a part of a constant-boiling mixture.

4. The process of preparing a lacquer thinner which comprises reacting a weakly water-soluble alcohol with an ester in the presence of water and a hydrocarbon; recovering the resulting hydrocarbon layer; and finally removing the water from the said hydrocarbon layer, by distillation, as a part of a constant-boiling mixture.

5. The process of preparing a lacquer thinner which comprises reacting butyl alcohol with ethyl acetate in the presence of ethyl alcohol, water, and a hydrocarbon; recovering the resulting hydrocarbon layer; and finally removing the water from the said hydrocarbon layer, by distillation, as a part of a constant-boiling mixture.

6. The process of preparing a lacquer thinner which comprises reacting butyl alcohol with ethyl acetate in the presence of ethyl alcohol, water, and toluol; recovering the resulting toluol layer; and finally removing the water from the said toluol layer, by distillation, as a part of a constant-boiling mixture.

7. The process of preparing a lacquer thinner which comprises refluxing a mixture comprising one volume butyl alcohol, two and one-half volumes, approximately, 50% ethyl acetate in ethyl alcohol, three volumes toluol, four volumes water, and six-tenths volume concentrated sulphuric acid; recovering the resulting toluol layer; and finally removing the water from the said toluol layer, by distillation, as a part of a constant boiling mixture.

8. The process of preparing a lacquer thinner which comprises refluxing a mixture comprising one volume butyl alcohol, two and one-half volumes, approximately, 50% ethyl acetate in ethyl alcohol, three volumes toluol, four volumes water, and six-tenths volume concentrated sulphuric acid, recovering the resulting toluol layer; and finally removing the water from said toluol layer by distilling off 10 to 20% of the mixture.

In testimony whereof we affix our signatures.

GROVER BLOOMFIELD.
JEROME MARTIN.
IGNACE J. KRCHMA.